United States Patent [19]

Deal et al.

[11] Patent Number: 4,560,581

[45] Date of Patent: Dec. 24, 1985

[54] METHOD FOR PREPARING LITHIUM-SILICATE GLARE-REDUCING COATING

[75] Inventors: Samuel B. Deal, Lancaster; Donald W. Bartch, Wrightsville, both of Pa.

[73] Assignee: RCA Corporation, Princeton, N.J.

[21] Appl. No.: 723,151

[22] Filed: Apr. 15, 1985

[51] Int. Cl.[4] .......................... H01J 31/00; B05D 5/02; C03C 17/22

[52] U.S. Cl. .......................................... 427/64; 427/73; 427/165; 427/169

[58] Field of Search .................... 427/64, 73, 165, 169

[56] References Cited

U.S. PATENT DOCUMENTS

| | | | |
|---|---|---|---|
| 3,565,675 | 2/1971 | Sams | 117/123 |
| 3,635,751 | 1/1972 | Long et al. | 117/94 |
| 3,898,509 | 8/1975 | Brown, Jr. | 313/478 |
| 3,940,511 | 2/1976 | Deal et al. | 427/165 |

*Primary Examiner*—James R. Hoffman
*Attorney, Agent, or Firm*—Eugene M. Whitacre; Dennis H. Irlbeck; LeRoy Greenspan

[57] ABSTRACT

A glare-reducing coating, as for the surface of the viewing window of a cathode-ray tube, is prepared by (a) warming a glass support above room temperature, (b) coating a surface of the warm support with an aqueous solution containing a lithium-stabilized silica sol and drying the deposited coating, (c) washing the dry coating with water and (d) baking the washed coating, preferrably at about 90° C.

11 Claims, 1 Drawing Figure

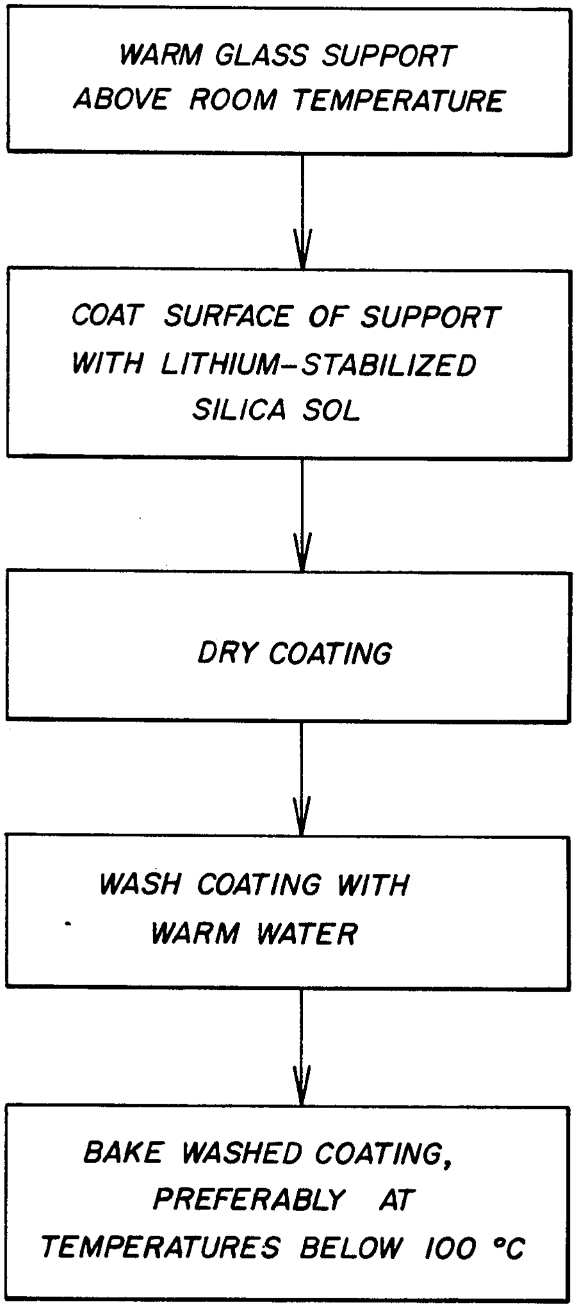
WARM GLASS SUPPORT ABOVE ROOM TEMPERATURE
COAT SURFACE OF SUPPORT WITH LITHIUM-STABILIZED SILICA SOL
DRY COATING
WASH COATING WITH WARM WATER
BAKE WASHED COATING, PREFERABLY AT TEMPERATURES BELOW 100 °C

METHOD FOR PREPARING LITHIUM-SILICATE GLARE-REDUCING COATING

This invention relates to an improved method for preparing a glare-reducing lithium silicate coating upon a glass support. The coating is particularly useful on the external surface of the viewing window of a display cathode-ray tube.

U.S. Pat. No. 3,940,511 to S. B. Deal et al. describes a method for preparing a lithium-silicate, glare-reducing coating upon a glass support. In that prior method, the glass support is warmed to temperatures of about 30° to 100° C. and then coated with an aqueous solution containing a lithium-stabilized silica sol. After the coating dries, it is baked at about 150° to 450° C. and then is washed with warm water and dried.

The final step of washing the baked coating with warm water is conducted, in the prior method, to remove soluble alkali compounds that are present in the coating and which may at a later time cause the formation of an objectionable haze. The washing step is conducted in the prior method after the baking step because the unbaked coating was thought to be too soluble in water and/or too poorly adherent to a glass support to retain its integrity. Also, baking the coating above 150° C. was thought to be necessary in order to reduce the solubility of the coating in water, to increase its adherence to a glass support, and to increase its resistance to abrasion to practical values.

SUMMARY OF THE INVENTION

The novel method comprises warming a glass support to temperatures above room temperature, preferably to about 55° C., and coating as by spraying, a surface of the warm support with an aqueous solution containing lithium-stabilized silica sol, and then drying the deposited coating. The dry coating is washed with water and then baked, preferably at about 90° C. The step of washing the dried but unbaked coating with water is conducted to remove soluble alkali compounds as in the prior method.

Suprisingly, the dried but unbaked coating is not too soluble in water or too poor in adherence to a glass support to be washed with warm water to remove soluble alkali compounds. By the novel method, the washed coating can then be baked, but at lower temperatures, below 100° C., with accompanying reductions in fuel cost and processing time. After baking the washed coating by the novel method, the coating is more resistant to abrasion than coatings produced by the prior method and can be more easily removed, as for removing a defective coating from a reusable support, within one week after baking.

BRIEF DESCRIPTION OF THE DRAWING

The sole FIGURE is a flow chart diagram of the novel method.

DETAILED DESCRIPTION OF THE PREFERRED EMBODIMENTS

The novel method may be practiced as described in the above-cited patent to S. B. Deal et al. except for the sequence of steps, some of the temperature ranges and the preferred operating temperatures. The principal change from the prior method is that the coating is washed before, instead of after, the baking step. As a consequence, the baking can be conducted at temperatures below 100° C. rather than at temperatures of 150° to 450° C. The coating produced by the novel method is more resistant to abrasion, and also defective coatings can be removed more easily for at least a week after baking.

The novel method is schematically illustrated in the flow-sheet diagram of the sole FIGURE. Prior to starting the novel method, a glass surface which is to carry the glare-reducing coating is carefully cleaned. The surface may be the outer surface of the faceplate of a cathode-ray tube, or the convex surface of a glass safety panel which is to be laminated to the faceplate of a cathode-ray tube, or the surface of any other glass support which is to be a viewing surface, such as the glass pane for a framed picture. The surface may be cleaned by any of the known scouring and washing methods used to remove dirt, lint, oil, scum, etc. It is preferred to scrub the surface with a commercial scouring compound, then to rinse with deionized water, then to swab with a 5% ammonium bifluoride solution, then again to rinse with deionized water, then to drain and dry the surface in air.

The glass support is then warmed to temperatures above room temperature; preferably in the range of 40° to 80° C. A surface of the warm support is coated with a dilute aqueous solution containing a lithium-stabilized silica sol. The solution may contain submicron-sized particles of carbon or other light-attenuating material. Carbon particles may be introduced as a suspension of carbon particles in water such as India Ink, Aquadag (marketted by Acheson Colloids Co., Port Huron, MI) or CARBOLAC (marketted by Cabot Corporation, Boston, MA) for example. The aqueous solution may also include one or a combination of tinting dyes to compensate for any undesirable tint in the coating or to impart a desired tint in the coating.

The clean warm surface is coated with a dilute aqueous solution comprising a lithium-stabilized silica sol. The preferred material is a lithium-stabilized silica sol having an $SiO_2$:$Li_2O$ mol ratio of about 4:1 to 25:1. The coating may be applied in one or several layers by any conventional process, such as by air spraying or airless spraying. Spraying with air may be conducted using a spray system with a suction feed and a high flow rate for the solution. It is preferred to use a spray system with a pressure feed and a low flow rate for the solution.

It is preferred to employ a spray process which applies many spray passes over the warm surface. It is preferred to turn the surface many times, with respect to the direction of the spray passes, during the spray application step in order to obtain greater uniformity. It is also preferred to use an ionized air spray as a method of coating application in order to obtain greater uniformity in the product.

The temperature of the surface, the specific technique for applying the coating and the number of layers applied are chosen empirically to produce a coating with the desired thickness. It has been found that, when applying the coating by spraying, the coating thickness should be such as to permit the operator to resolve the three bulbs of the reflection of a three-bulb fluorescent-light fixture located about 6 feet above the glass support. Generally, the thicker the coating, the greater the reduction in glare and the greater the loss in resolution of the viewed image. Conversely, the thinner the coating, the less the reduction in glare and the less the loss in image resolution.

When applied by spraying, the coating takes on an appearance of dryness. Greater appearance of dryness is achieved (1) by using a higher support temperature while applying the coating, (2) by using more air in the spray when spraying with compressed air, (3) by using a greater spraying distance when spraying on the coating and (4) by increasing the mol ratio of $SiO_2$:$Li_2O$ in the sol that is used. But, when any of these expedients is overdone, the coating will craze. The greater the appearance of dryness, the greater the glare reduction and the greater the loss in resolution of the viewed image.

After coating the warm glass support, the coating is dried in air with care to avoid the deposition of lint or other foreign particles on the coating. When the coating is sprayed on a suitably warm support, the wet coating will dry in air within 60 seconds without additional heat being applied.

When the coating is dry, and before any baking, the dry coating is washed with warm water, which may be about 45° to 95° C. It is preferred to use the hottest water available for this purpose. The washing step may be conducted by dipping the coating in or by flushing the surface of the coating with water. In the preferred method, wash water is applied by pressure spray to the coating. Acid reagents, such as a 5-percent acetic acid, may be included in the wash water. The use of pressure spray with hotter water or with acetic acid completely eliminates the tendency to form a haze on the coating.

After the coating has been washed, it is dried in air and then baked in air. With the novel sequence of steps, the coating may be baked at lower temperatures than are required for the prior method. Generally, with the novel method, baking is conducted at temperatures below 100° C. and preferably at about 90° C. Baking time is generally about 10 to 60 minutes. The optimum conditions of time and temperature are determined empirically. Generally, the higher the heating temperature, the higher will be the abrasion resistance. The coating may be recycled through the heating step.

As compared with the prior method, the novel method reverses the baking and washing steps and also the baking temperatures can be reduced from 150° to 450° C. to below 100° C. By reducing the baking temperature, there is a savings in fuel cost. Also, the change provides for a much faster production rate by eliminating the need to cool the support to at least about 60° C., which is required prior to the washing step in the prior method. If the support is not cooled properly in the prior method, it could result in thermal shock and breakage of the support during the washing step. Since, in the novel method, the last step is the baking step, there is no need for controlled rapid cooling. The lower baking temperature also allows direct feed onto a production line and also reduces the chances of internal parts degassing, where the support is a glass wall of a vacuum electron tube.

Although a lower baking temperature is employed in the novel method, there is no loss or reduction in abrasion resistance of the coating. This effect apparently results from adequate removel of soluble alkali compounds from the coating during the washing step. By the prior method, with baking preceding washing, a baking temperature lower than about 120° C. resulted in a coating with lower abrasion resistance.

The novel method, particularly when the coating is applied with a pressure feed-low flow rate spray system, can result in coating with improved glare-reducing characteristics and higher production yields. Generally, coatings produced by the novel method exhibit lower SR (specular reflectance) and a much smaller lowering of the MTF (modulation transfer function), as defined by the method disclosed in U.S. Ser. No. 583,973 filed Feb. 7, 1984, by G. M. Ehemann, Jr.

Another advantage of the novel method is that a defective coating can be removed from its support more easily than coatings produced by the prior method, permitting more economical salvage of the support. Salvage may be carried out by sponge washing of the defective coating with a 5% ammonium bifluoride solution either before or after the baking step, and up to at least a week after drying the coating.

EXAMPLE

The external glass viewing window surface of an operable 25V size color television picture tube is scoured with a mild abrasive cleaner and warm (49° to 60° C.) water to remove all foreign material. After rinsing with warm water, the surface is washed with 5% ammonium bifluoride solution, again rinsed with warm water and then blown dry with a hot-air knife. The temperature of the viewing window is adjusted to about 55° C. and then spray coated with multiple passes of a lithium silica sol solution consisting essentially of 10% Lithium Silicate 48 (marketted by DuPont, Wilmington, DE) containing 22.1% solids and 90 weight % water. The spray is applied in 24 frames, with 8 passes per frame, 6 frames per set, and a 90° rotation after each set. Because of the heat in the window, the deposited coating material dries within 10 seconds after each pass. The dry coating is washed with warm (49° to 60° C.) deionized water applied as a limp stream to the coating for about 15 seconds and then dried by applying a hot-air knife at about 65° C. The washed and dried coating is now baked at about 90° C. for about 10 minutes and then permitted to cool.

What is claimed is:

1. A method for preparing an optical viewing screen having a glare-reducing viewing surface comprising (a) warming a glass support to temperatures above room temperature, (b) coating a surface of said warm support with an aqueous solution containing lithium-stabilized silica sol, and drying the deposited coating, (c) washing said dry coating with water, (d) and then, subsequent to said washing step (c), baking said washed coating.

2. The method defined in claim 1 wherein, at step (d) said washed coating is baked at temperatures below 100° C.

3. The method defined in claim 2 wherein, at step (d), said washed coating is baked at about 90° C. for about 10 minutes.

4. The method defined in claim 1 where, at step (c), said dry coating is washed for about 10 to 60 seconds in a limp stream of water having a temperature of about 49° to 60° C., and then dried with forced air at about 60° to 70° C. impinging thereon.

5. The method defined in claim 1 wherein, at step (a), said glass support is warmed to about 40° to 80° C.

6. The method defined in claim 5 wherein said glass support is warmed to about 55° C.

7. A method for preparing an optical viewing screen having a glare-reducing viewing surface comprising:

(a) warming a glass support to temperatures of about 40° to 80° C., (b) coating a surface of said warm support with an aqueous solution consisting essentially of lithium-stabilized silica sol, said coating becoming dry after deposition upon said warm support, (c) washing said dry coating with warm water (d) and then, after washing step (c), baking said washed coating at temperatures below 100° C.

8. The method defined in claim 7 wherein, at step (d), said washed coating is baked at about 90° C.

9. The method defined in claim 7 wherein, at step (c), said dry coating is washed in water having a temperature of about 45° to 65° C.

10. The method defined in claim 7 wherein, at step (b), said surface is sprayed with multiple passes of said solution.

11. The method defined in claim 7 wherein, at step (a), said support is warmed to temperatures of about 55° C.

* * * * *

UNITED STATES PATENT AND TRADEMARK OFFICE

CERTIFICATE OF CORRECTION

PATENT NO. : 4,560,581

DATED : December 24, 1985

INVENTOR(S) : Samuel Broughton Deal et al.

It is certified that error appears in the above-identified patent and that said Letters Patent is hereby corrected as shown below:

Column 4, line 5 change "February 7, 1984" to -- February 27, 1984 --

Signed and Sealed this

*Eighth* Day of *April 1986*

[SEAL]

*Attest:*

DONALD J. QUIGG

*Attesting Officer* *Commissioner of Patents and Trademarks*